United States Patent
Nakanishi

(10) Patent No.: US 12,522,931 B2
(45) Date of Patent: Jan. 13, 2026

(54) FUEL MANUFACTURING METHOD AND FUEL MANUFACTURING APPARATUS

(71) Applicant: TOYOTA JIDOSHA KABUSHIKI KAISHA, Toyota (JP)

(72) Inventor: Haruyuki Nakanishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/983,796

(22) Filed: Dec. 17, 2024

(65) Prior Publication Data

US 2025/0305157 A1    Oct. 2, 2025

(30) Foreign Application Priority Data

Mar. 29, 2024  (JP) .................. 2024-057847

(51) Int. Cl.
| | |
|---|---|
| *C25B 3/03* | (2021.01) |
| *C25B 3/26* | (2021.01) |
| *C25B 11/077* | (2021.01) |
| *C25B 15/08* | (2006.01) |

(52) U.S. Cl.
CPC ............ *C25B 3/03* (2021.01); *C25B 3/26* (2021.01); *C25B 11/077* (2021.01); *C25B 15/08* (2013.01)

(58) Field of Classification Search
None
See application file for complete search history.

(56) References Cited

U.S. PATENT DOCUMENTS

| | | |
|---|---|---|
| 5,865,982 A | 2/1999 | Sawa et al. |
| 2022/0074068 A1 | 3/2022 | Wada |

FOREIGN PATENT DOCUMENTS

| | | | |
|---|---|---|---|
| JP | H10-008280 A | | 1/1998 |
| JP | 2017-534764 A | | 11/2017 |
| JP | 2018010758 A | * | 1/2018 |
| JP | 2021-001403 A | | 1/2021 |
| JP | 2022-045695 A | | 3/2022 |
| WO | 2016/079746 A1 | | 5/2016 |

OTHER PUBLICATIONS

English abstract of Takahashi JP-2018010758-A (Year: 2018).*

* cited by examiner

*Primary Examiner* — Wojciech Haske
(74) *Attorney, Agent, or Firm* — SoraIP, Inc.

(57) ABSTRACT

A fuel manufacturing method for manufacturing $CH_4$ by repeatedly performing step 1 and step 2 in this order, wherein step 1 includes: charging an electrochemical cell including a positive electrode having $Ni_2O_3H$ on a surface, a negative electrode containing a hydrogen absorbing alloy, and a $KHCO_3$ aqueous solution by an electric potential control device to accumulate hydrogen in the hydrogen absorbing alloy at the negative electrode, the electric potential control device being connected to each of the positive electrode and the negative electrode; and then terminating the charging, step 2 includes: supplying a raw material containing at least one of $CO_2$ and $KHCO_3$ aqueous solutions to the electrochemical cell to produce $CH_4$ at the negative electrode; and then terminating the supply of the raw material, and the electrochemical cell is a used nickel-metal hydride secondary battery.

5 Claims, 3 Drawing Sheets

FUEL MANUFACTURING METHOD AND FUEL MANUFACTURING APPARATUS

CROSS-REFERENCE TO RELATED APPLICATION

This application claims priority to Japanese Patent Application No. 2024-057847 filed on Mar. 29, 2024, incorporated herein by reference in its entirety.

BACKGROUND

1. Technical Field

The present disclosure relates to a fuel manufacturing method and a fuel manufacturing apparatus.

2. Description of Related Art

Starting with the Sabatier reaction that produces methane and water from hydrogen and carbon dioxide in the presence of nickel as a catalyst, various techniques have been developed to produce fuels, such as methane and hydrogen, using electrochemical reactions.

For example, there is a known method for producing hydrocarbons by reacting hydrogen contained in a hydrogen absorbing alloy used for the negative electrode of an alkaline secondary battery with carbon dioxide (Japanese Patent Application Publication No. H10-008280).

Moreover, there is a known system that generates hydrogen gas from an aqueous solution by an electrochemical reaction using a platinum electrode (Japanese Patent Application Publication No. 2021-001403).

SUMMARY

Excellent safety, heat balance, cost performance, etc. are required when manufacturing fuels such as methane by electrochemical reactions.

For example, when methane and oxygen are generated within the same cell by an electrochemical reaction, there is a risk that methane and oxygen may react, and therefore some measures such as collecting oxygen need to be taken (JP H10-008280 A).

Moreover, when expensive platinum is used for an electrode, it may be difficult to reduce fuel manufacturing costs (JP 2021-001403 A).

The problem to be solved by an embodiment of the present disclosure is to provide a fuel manufacturing method and a fuel manufacturing apparatus that ensure excellent safety when manufacturing fuels.

Means for solving the problem include the following aspects.

1. A fuel manufacturing method for manufacturing $CH_4$ by repeatedly performing step 1 and step 2, wherein step 1 includes: charging an electrochemical cell including a positive electrode having $Ni_2O_3H$ on a surface, a negative electrode containing a hydrogen absorbing alloy, and a $KHCO_3$ aqueous solution by an electric potential control device to cause the hydrogen absorbing alloy to absorb hydrogen at the negative electrode, the electric potential control device being connected to each of the positive electrode and the negative electrode; and then terminating the charging, step 2 includes: supplying a raw material containing at least one of $CO_2$ and $KHCO_3$ aqueous solutions to the electrochemical cell to produce $CH_4$ at the negative electrode; and then terminating the supply of the raw material, and the electrochemical cell is a used nickel-metal hydride secondary battery.

2. The fuel manufacturing method as described in 1, including, before step 1, performing pre-treatment for forming $Ni_2O_3H$ on the surface of the positive electrode, wherein the pre-treatment includes repeatedly and alternately applying mutually different first electric potential and second electric potential to the positive electrode in a state in which the positive electrode containing Ni is immersed in an alkaline aqueous solution.

3. The fuel manufacturing method as described in 1 or 2, including performing step 3 when step 2 is performed, wherein step 3 includes: collecting a $K_2CO_3$ solution produced in step 2; mixing the $K_2CO_3$ solution with the air to produce a $KHCO_3$ aqueous solution; and supplying the produced $KHCO_3$ aqueous solution as the raw material to the electrochemical cell.

4. A fuel manufacturing apparatus including a first unit for generating $CH_4$, and a second unit for supplying a raw material for $CH_4$ to the first unit, wherein the first unit includes: an electrochemical cell including a positive electrode having $Ni_2O_3H$ on a surface, a negative electrode that contains a hydrogen absorbing alloy and generates $CH_4$, and a $KHCO_3$ aqueous solution; and an electric potential control device connected to each of the positive electrode and the negative electrode, and the second unit includes: a mixer that mixes a $K_2CO_3$ solution collected from the first unit with the air; and a supplier that supplies a $KHCO_3$ aqueous solution produced by the mixer as the raw material to the first unit.

5. The fuel manufacturing apparatus as described in 4, wherein the electrochemical cell is a used nickel-metal hydride secondary battery.

According to the embodiment of the present disclosure, the fuel manufacturing method and fuel manufacturing apparatus that ensure excellent safety when manufacturing fuels are provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
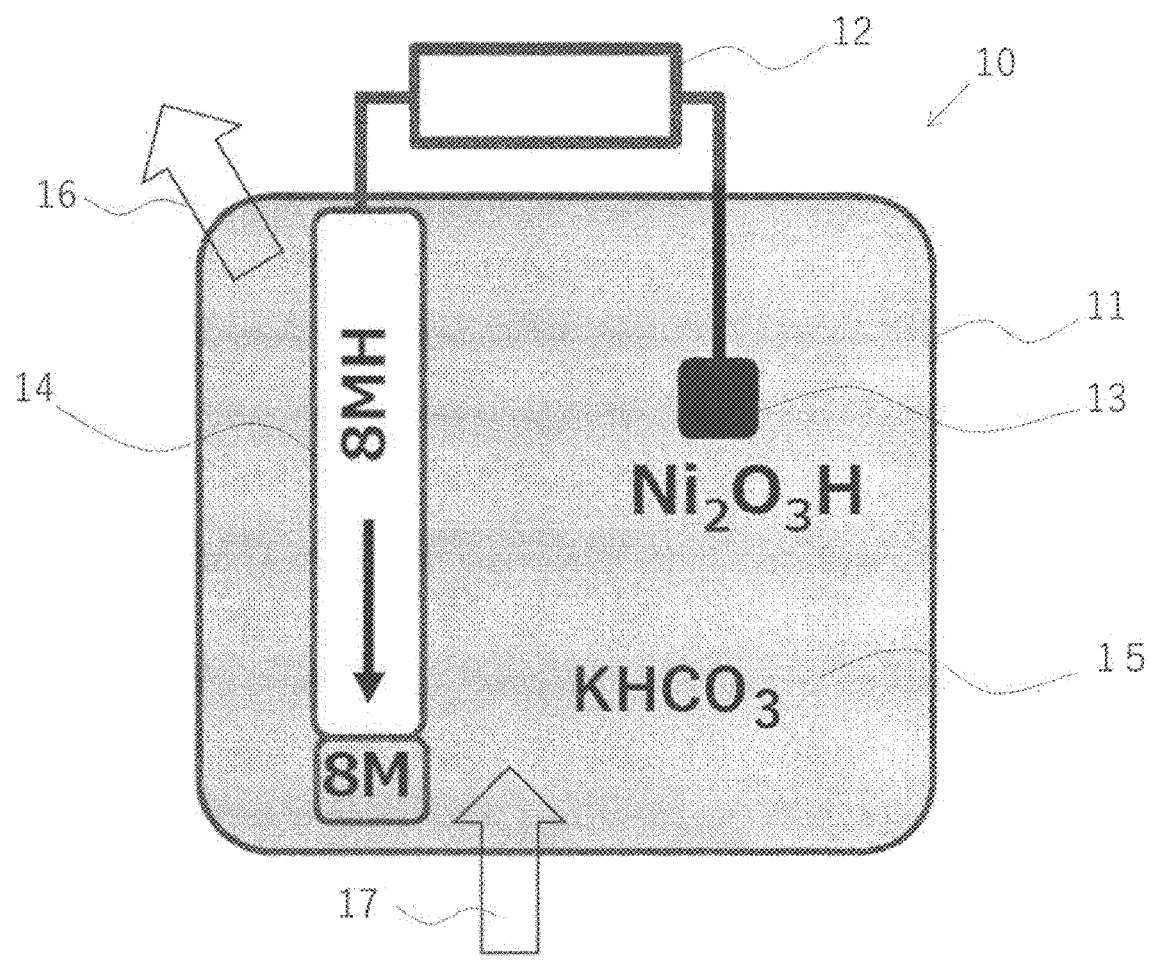
FIG. 1 is an explanatory view for explaining the configuration of a first unit.

Hereinafter, embodiments of the present disclosure will be described with reference to the drawings.

In the present disclosure, when an embodiment is described with reference to drawings, the configuration of the embodiment is not limited to the configuration shown in the drawings. A constituent part designated using the same reference sign in the drawings means the same constituent part. In the drawings, only some constituent parts may be labeled with reference signs. The dimensional ratios in the drawings do not necessarily show the actual dimensional ratios.

In the present disclosure, a numerical range indicated using "to" means a range that includes the numerical values before and after "to" as the minimum value and the maximum value, respectively.

In the numerical ranges described stepwise in the present disclosure, an upper limit value or a lower limit value described in a numerical range may be replaced with another upper limit value or lower limit value of another numerical range described stepwise. In the numerical ranges described stepwise in the present disclosure, an upper limit value or a lower limit value described in a numerical range may be replaced with a value shown in an example.

In the present disclosure, the word "step" includes not only an independent step, but also a step as long as the intended purpose of the step is achieved even if the step cannot be clearly distinguished from other steps.

In the present disclosure, a combination of two or more preferred aspects is a more preferred aspect.

In the present disclosure, unless otherwise specified, when there is a plurality of types of substances corresponding to each component, the amount of each component means the total amount of the plurality of types of substances.

Fuel Manufacturing Apparatus

A fuel manufacturing apparatus of the present disclosure includes a first unit. As shown in FIG. 1, the first unit 10 includes an electrochemical cell 11 and an electric potential control device 12. The electrochemical cell 11 includes: a positive electrode 13 having $Ni_2O_3H$ on a surface; a negative electrode 14 containing a hydrogen absorbing alloy; and a $KHCO_3$ aqueous solution 15 as an electrolyte.

The electrochemical cell 11 preferably further includes a collection port 16 for collecting produced $CH_4$, $K_2CO_3$ solution, etc., and a supply port 17 for supplying a raw material for $CH_4$ to be produced.

The electrochemical cell 11 is a used nickel-metal hydride secondary battery. The fuel manufacturing apparatus of the present disclosure uses the used nickel-metal hydride secondary battery as a flow reactor.

The positive electrode 13 has $Ni_2O_3H$ on the surface. For the positive electrode 13, it is possible to use a positive electrode that is conventionally used for nickel-metal hydride secondary batteries and that contains Ni as a positive electrode active material. As described later, the positive electrode 13 having $Ni_2O_3H$ on the surface may be obtained by performing a pre-treatment step on the positive electrode 13 containing Ni.

For the negative electrode 14, it is possible to use a negative electrode that is conventionally used for nickel-metal hydride secondary batteries and that contains a hydrogen absorbing alloy as a negative electrode active material. Types of hydrogen absorbing alloy are not limited, and various types of hydrogen absorbing alloy can be used as long as the hydrogen absorbing alloy reversibly absorbs and releases hydrogen. Specifically, examples include mischmetals, such as $MmNi_5$, and highly active metals including Ni, Co, Mn, Al, etc. Note that Mm is a mixture of rare-earth elements such as Ce and La.

The electrolyte contained in the electrochemical cell 11 is the $KHCO_3$ aqueous solution 15. The $KHCO_3$ aqueous solution 15 not only serves as the electrolyte, but also is a raw material for $CH_4$ because the $KHCO_3$ aqueous solution 15 produces $CH_4$ by reacting with hydrogen accumulated in the hydrogen absorbing alloy of the negative electrode 14.

The electric potential control device 12 is a device for controlling the electric potentials of the positive electrode 13 and the negative electrode 14, and has a function similar to the function of a so-called potentiostat.

It is possible to synthesize methane using the first unit 10. Since the first unit 10 utilizes a used nickel-hydrogen secondary battery, the first unit 10 is a device capable of reducing the cost of synthesizing methane.

The fuel manufacturing apparatus of the present disclosure can include a second unit in addition to the first unit 10.

Figure 2:
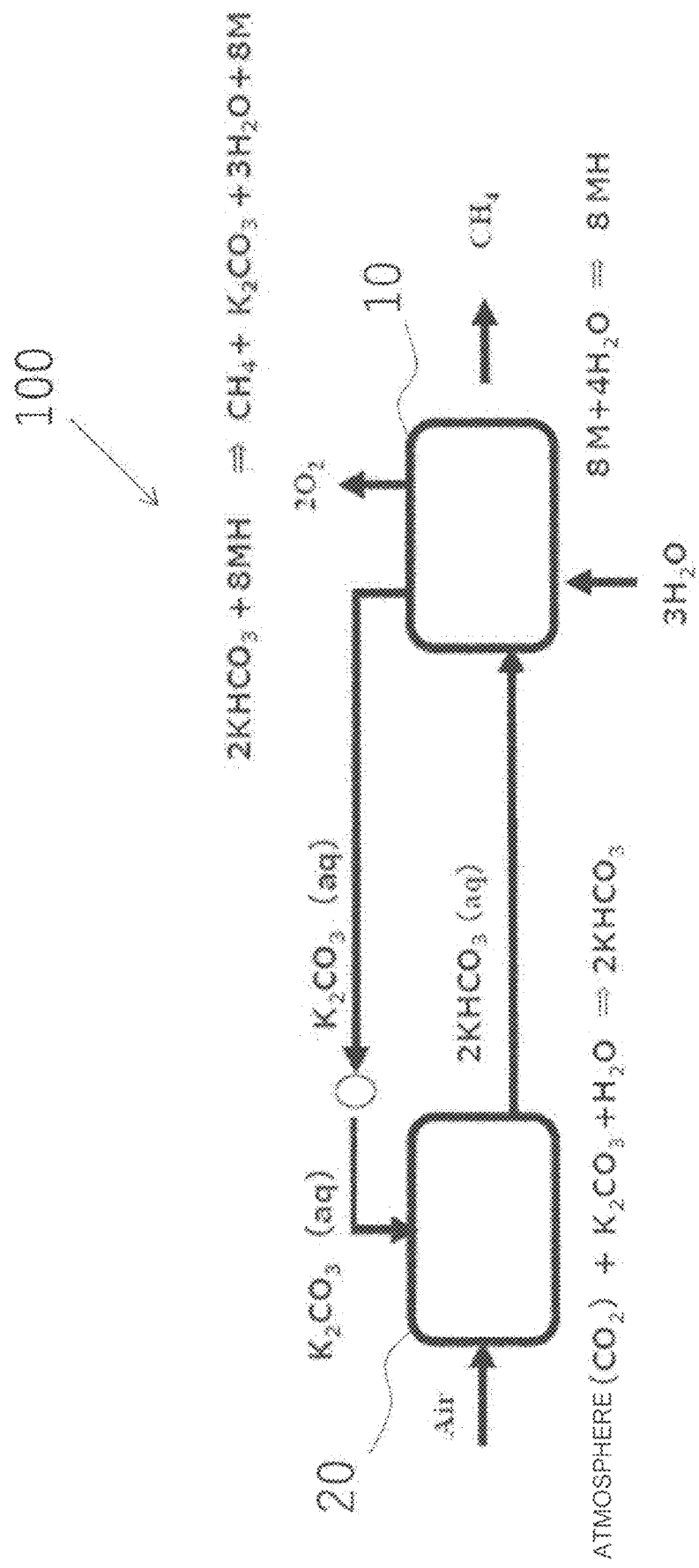
FIG. 2 is an explanatory view for explaining the configuration of a fuel manufacturing apparatus.

As shown in FIG. 2, a fuel manufacturing apparatus 100 of the present disclosure includes the first unit 10 and a second unit 20. The first unit 10 produces $CH_4$, and the second unit 20 supplies a raw material for $CH_4$ to the first unit 10.

Figure 3:
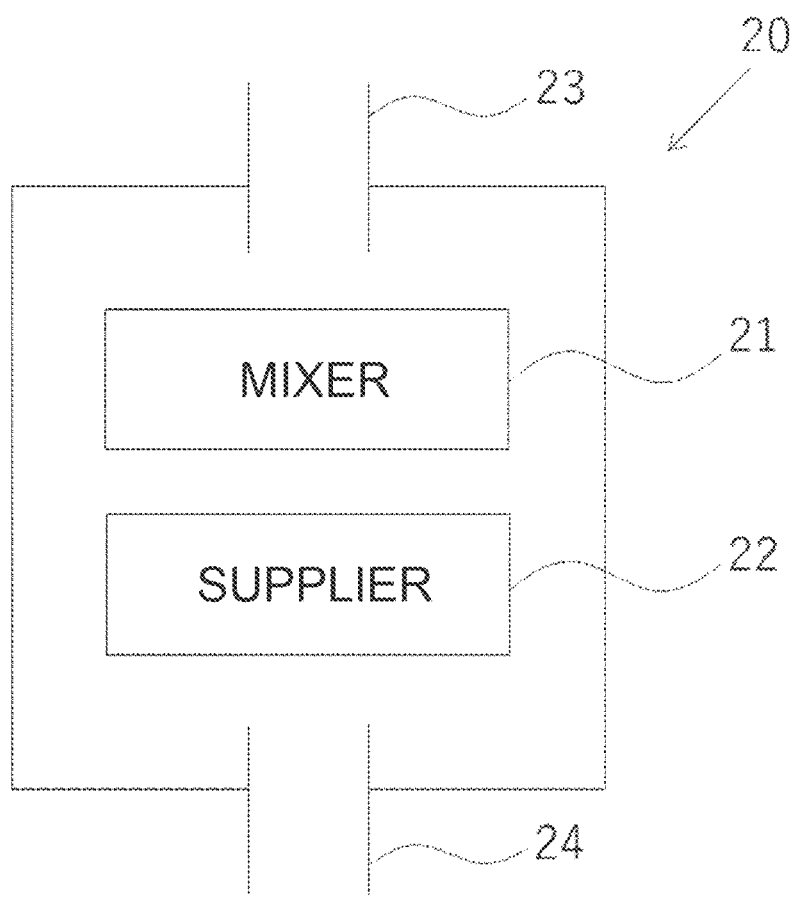
FIG. 3 is an explanatory view for explaining the configuration of a second unit.

As shown in FIG. 3, the second unit 20 includes: a mixer 21 that mixes a $K_2CO_3$ solution collected from the first unit 10 with the air; and a supplier 22 that supplies a $KHCO_3$ aqueous solution produced by the mixer 21 as the raw material to the first unit 10. The mixer 21 can capture carbon dioxide in the air.

The second unit 20 preferably further includes a supply port 23 for supplying the $K_2CO_3$ aqueous solution collected from the first unit 10 and the air to the mixer 21, and a discharge port 24 for supplying the produced $KHCO_3$ aqueous solution as the raw material from the supplier 22 to the first unit 10.

In the fuel manufacturing apparatus 100 of the present disclosure, the electrochemical cell 11 of the first unit 10 uses the used nickel-metal hydride secondary battery as the flow reactor, thereby not only reducing the cost of the apparatus, but also contributing to a reduction in the cost associated with disposal of the used nickel-metal hydride secondary battery.

Moreover, the second unit 20 uses the air as a raw material to be supplied to the first unit 10, and also performs the function of capturing $CO_2$ contained in the air. Consequently, there is no cost for using separated $CO_2$, thereby contributing to a reduction in fuel manufacturing costs.

As described above, the fuel manufacturing apparatus 100 of the present disclosure is a fuel manufacturing apparatus capable of reducing fuel manufacturing costs.

Fuel Manufacturing Method

Step 1 and Step 2

A fuel manufacturing method of the present disclosure is a fuel manufacturing method for manufacturing $CH_4$ by repeatedly performing later-described step 1 and step 2 in this order. In the fuel manufacturing method, first, step 1 is performed.

Step 1

Step 1 is a step of charging the electrochemical cell 10 (see FIG. 1) by the electric potential control device 12.

During charging, it is preferable to keep the current density substantially constant at 0 to 1 A/cm$^2$ and perform the charging with constant current charging until an open circuit voltage (OCV) detected by a voltage sensor included in the electric potential control device 12 reaches 1.4 V.

Moreover, the temperature of the electrolyte is preferably 50° C. or lower. When the temperature of the electrolyte is acquired, the electrochemical cell 10 may have a temperature sensor.

As described above, it is preferable to perform the charging until the open circuit voltage (OCV) detected by the voltage sensor included in the electric potential control device 12 reaches 1.4 V, and then, upon reaching 1.4 V, terminate the charging.

By the charging, hydrogen is accumulated in the hydrogen absorbing alloy at the negative electrode 14. At the positive electrode 13, $O_2$ is generated. The generated $O_2$ is preferably released into the atmosphere.

Step 2

Step 2 is performed after step 1. Step 2 includes supplying a raw material containing at least one of $CO_2$ and $KHCO_3$ aqueous solutions to the electrochemical cell 10 to produce $CH_4$ at the negative electrode 14. The produced $CH_4$ is collected and used as fuel.

The $CO_2$ or $KHCO_3$ aqueous solution is the raw material for $CH_4$ to be produced at the negative electrode 14. When $CO_2$ is present as the raw material for $CH_4$, a reduction reaction of $CO_2$ proceeds at the negative electrode 14, and $CH_4$ is produced. Moreover, when a $KHCO_3$ aqueous solution is present as the raw material for $CH_4$, a reaction represented by equation (1) below proceeds using H absorbed by the negative electrode 14.

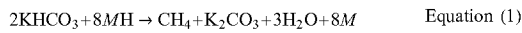

$$2KHCO_3 + 8MH \rightarrow CH_4 + K_2CO_3 + 3H_2O + 8M \quad \text{Equation (1)}$$

Since there is no need to use $CO_2$, a $KHCO_3$ aqueous solution is preferred as the raw material for $CH_4$ to be supplied to the electrochemical cell 10.

In step 2, the electric potential control device 12 does not apply a voltage to the electrochemical cell 10, and monitors the voltage of the positive electrode 13 and the negative electrode 14. It is preferable to supply the raw material until the voltage reaches 0.6 V while monitoring the voltage, and produce $CH_4$. It is preferable to stop supplying the raw material when the voltage reaches 0.6 V. This makes it possible to prevent an oxygen absorbing alloy in the negative electrode 14 from being completely oxidized.

After step 2, again, charging in step 1 is performed and then step 2 is performed. Thus, step 1 and step 2 can be performed repeatedly in this order.

Since the fuel manufacturing method of the present disclosure is configured as described above, $O_2$ and $CH_4$ are not generated simultaneously, and, therefore this method is highly safe, uses a thermodynamically favorable reaction, and can highly efficiently manufacture $CH_4$.

Pre-Treatment Step

Note that, before step 1, a pre-treatment step for forming $Ni_2O_3H$ on the surface of the positive electrode may be performed. The pre-treatment step is preferably performed when the surface of the positive electrode is not coated with $Ni_2O_3H$, or when the amount of $Ni_2O_3H$ coating on the surface is small if the surface is coated with $Ni_2O_3H$.

The pre-treatment step includes repeatedly and alternately applying mutually different first electric potential and second electric potential to the positive electrode in a state in which the positive electrode containing Ni is immersed in an alkaline aqueous solution. The first electric potential is an electric potential at which Ni is tetravalent in a Ni—$H_2O$ system, and the second electric potential is an electric potential at which Ni is divalent in the Ni—$H_2O$ system.

The electric potential control device 12 can apply the first electric potential and the second electrode potential controlled as described above.

For the formation of $Ni_2O_3H$ on the surface of the positive electrode containing Ni by such a method, it is possible to employ a method described in Japanese Patent Application Publication No. 2022-45695.

It is possible to sufficiently form $Ni_2O_3H$ on the surface of the positive electrode by the pre-treatment step. Since $Ni_2O_3$ has both corrosion resistance and electrical conductivity, the positive electrode 13 having $Ni_2O_3H$ on the surface can be used stably for a long time.

Step 3

Note that step 3 may be performed when step 2 is performed. Step 3 includes: collecting a $K_2CO_3$ solution produced in step 2; mixing the $K_2CO_3$ solution with the atmosphere to produce a $KHCO_3$ aqueous solution; and supplying the produced $KHCO_3$ aqueous solution as the raw material to the electrochemical cell.

Step 3 is performed in the unit 2 (see FIG. 2).

In step 3, firstly the $K_2CO_3$ solution produced in step 2 is collected. As shown by equation (1), $K_2CO_3$ is produced when $CH_4$ is produced. $K_2CO_3$ is collected as a solution.

The collected $K_2CO_3$ solution is mixed with the air in the mixer 21 (see FIG. 3). At this time, a reaction of equation (2) below proceeds using $CO_2$ in the air.

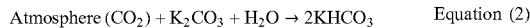

$$\text{Atmosphere}(CO_2) + K_2CO_3 + H_2O \rightarrow 2KHCO_3 \quad \text{Equation (2)}$$

The produced $KHCO_3$ aqueous solution can be used as the raw material for $CH_4$ as shown in equation (1), and is, therefore, supplied to the electrochemical cell 10.

There is no need to use a separated compound such as $CO_2$ in the flow of substance in the fuel manufacturing method of the present disclosure (see FIG. 2). Consequently, the fuel is manufactured with fewer steps. Moreover, heat generated in the Sabatier reaction that produces $CH_4$ is offset by heat absorption due to the decomposition of $KHCO_3$, and this is an advantage in terms of energy.

Further, since a used nickel-metal hydride secondary battery is usable as the electrochemical cell 10, it is possible to manufacture the fuel at lower costs. Furthermore, in this step, $O_2$ and $CH_4$ are not generated simultaneously.

Thus, the fuel manufacturing method of the present disclosure is a fuel manufacturing method that ensures excellent safety and can reduce fuel manufacturing costs.

Hereinafter, the present disclosure will be described in further detail through experimental examples.

Experimental Example 1

It was confirmed that the production of $CH_4$ in step 2 was performed as follows, using a $KHCO_3$ aqueous solution as an electrolyte.

An electrochemical cell for testing was used. In this electrochemical cell, a fully charged 4 $cm^2$ MH battery negative electrode ($LaNi_5$) was used as a negative electrode. Pt was used as the counter electrode, and a voltage of 80 V was applied. Note that the current was 0.027 A/$cm^2$.

When the negative electrode was exposed to a saturated potassium carbonate aqueous solution (33.7 g/100 mL), gas was produced from the negative electrode.

When the produced gas was collected in a pack and analyzed by gas chromatography, it was confirmed that $CH_4$ was produced.

Experimental Example 2

Gas was generated from the negative electrode in the same manner as in Experimental Example 1, except that a KOH aqueous solution was used as an electrolyte.

When the produced gas was collected in a pack and analyzed by gas chromatography, it was found that $H_2$ and $CO_2$ were generated, but generation of any fuel gas, including $CH_4$, was not observed.

What is claimed is:

1. A fuel manufacturing method for manufacturing $CH_4$ by repeatedly performing step 1 and step 2, wherein step 1 includes: charging an electrochemical cell comprising a positive electrode having $Ni_2O_3H$ on a surface, a negative electrode containing a hydrogen absorbing alloy, and a $KHCO_3$ aqueous solution by an electric potential control device to cause the hydrogen absorbing alloy to absorb hydrogen at the negative electrode, the electric potential control device being connected to each of the positive electrode and the negative electrode; and then terminating the charging, step 2 includes: supplying a raw material containing at least one of $CO_2$ and $KHCO_3$ aqueous solutions to the electrochemical cell to produce $CH_4$ at the negative electrode; and then terminating the supply of the raw material, and the electrochemical cell is a used nickel-metal hydride secondary battery.

2. The fuel manufacturing method according to claim 1, including, before step 1, performing pre-treatment for forming $Ni_2O_3H$ on the surface of the positive electrode, wherein the pre-treatment includes repeatedly and alternately applying mutually different first electric potential and second electric potential to the positive electrode in a state in which the positive electrode containing Ni is immersed in an alkaline aqueous solution.

3. The fuel manufacturing method according to claim 1, including performing step 3 when step 2 is performed, wherein step 3 includes: collecting a $K_2CO_3$ solution produced in step 2; mixing the $K_2CO_3$ solution with air to produce a $KHCO_3$ aqueous solution; and supplying the produced $KHCO_3$ aqueous solution as the raw material to the electrochemical cell.

4. A fuel manufacturing apparatus including a first unit for generating $CH_4$, and a second unit for supplying a raw material for $CH_4$ to the first unit, wherein the first unit comprises: an electrochemical cell including a positive electrode having $Ni_2O_3H$ on a surface, a negative electrode that contains a hydrogen absorbing alloy and generates $CH_4$, and a $KHCO_3$ aqueous solution; and an electric potential control device connected to each of the positive electrode and the negative electrode, and the second unit comprises: a mixer that mixes a $K_2CO_3$ solution collected from the first unit with air; and a supplier that supplies a $KHCO_3$ aqueous solution produced by the mixer as the raw material to the first unit.

5. The fuel manufacturing apparatus according to claim 4, wherein the electrochemical cell is a used nickel-metal hydride secondary battery.

* * * * *